March 19, 1963 C. D. MORRILL ET AL 3,082,381
AUTOMATIC GAIN CONTROL CIRCUIT
Filed May 27, 1959
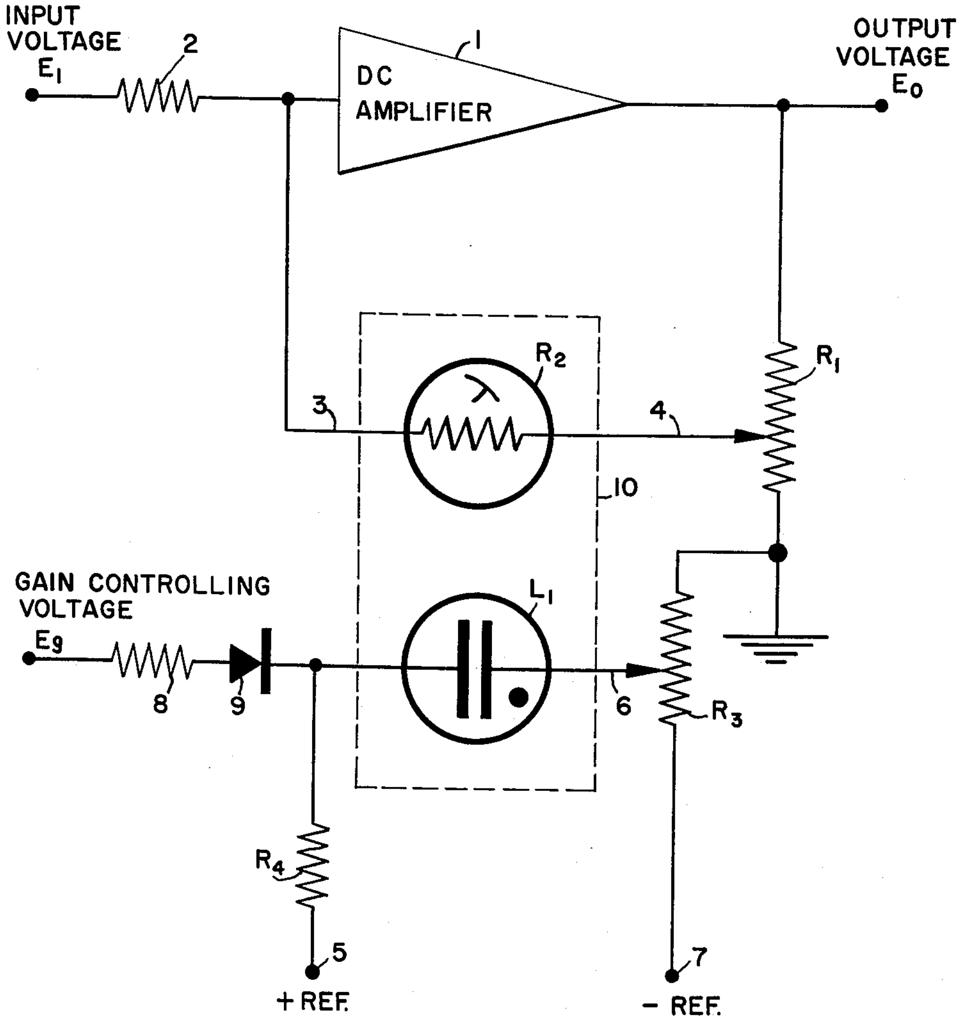
INVENTORS
CHARLES D. MORRILL
BY ROBERT C. WEYRICK
ATTORNEY United States Patent Office 3,082,381

Patented Mar. 19, 1963

3,082,381
AUTOMATIC GAIN CONTROL CIRCUIT

Charles D. Morrill, Cuyahoga Falls, and Robert C. Weyrick, Akron, Ohio, assignors to Goodyear Aircraft Corporation, Akron, Ohio, a corporation of Delaware Filed May 27, 1959, Ser. No. 816,239
3 Claims. (Cl. 330—59)

This invention relates to the automatic control of gain of an amplifier and is especially useful where D.C. amplifiers are employed in analog computors, servomechanisms, and for similar situations where the gain of a D.C. amplifier should be varied as a function of some independent variable.

It is an object of the present invention to provide for automatic control of the gain of a D.C. amplifier.

Another object is to control the gain of the amplifier by use of a light sensitive resistance unit in the feedback circuit and exposed to light resulting from variation of voltage representing an independent variable.

A further object is to provide a reference voltage for providing ignition of a neon lamp light source when the gain controlling voltage is zero or slightly greater.

These and other objects will appear from the following description and the accompanying drawing.

In the drawing, the numeral 1 designates a D.C. amplifier to which an input voltage $E_1$ may be applied through a resistance 2 to provide an output voltage $E_0$. A feedback circuit 3 is connected through a resistor $R_2$ to the sliding arm 4 of a potentiometer $R_1$ which is connected between the output of the amplifier and ground and providing a manually controlled gain control of the amplifier.

For controlling gain of the amplifier automatically, the resistor $R_2$ is of the type in which resistance changes inversely as the strength of light falling upon it, such as the cadmium sulphide photoconductive cell. A light generating unit $L_1$ is positioned to cast light upon the light sensitive resistance. This light unit is preferably a neon lamp such as the NE–2 or similar device and is supplied at its positive element with current from a positive reference voltage 5 through a resistor $R_4$, its negative element being connected to a slide element 6 of a potentiometer $R_3$ having one end connected to the ground and the other end connected to a negative reference voltage 7. A gain controlling voltage $E_g$ having positive polarity is connected to the positive element of the light $L_1$ through a resistance and a crystal diode 9. The purpose of diode 9 is to permit current flow from $E_g$ to $L_1$ but to prevent current flow from positive reference 5 into the gain control line through resistor 8 so that the reference current will flow entirely to $L_1$. The purpose of resistor 8 is to provide a current through $L_1$ that is proportional to the gain controlling voltage $E_g$.

Potentiometer $R_1$ is a manual gain control and establishes the desired gain independent of variations among light sensitive resistors and neon light sources. Potentiometer $R_3$ is a manual adjustment for variation in voltage drop across neon light sources. Current through $R_4$ from positive reference 5 provides lamp ignition when the gain controlling voltage is zero or slightly greater.

The light sensitive resistor $R_2$ and the light sources $L_1$ are enclosed by a box 10 to shield the resistor and to prevent light from another source effecting operation of $R_2$. The gain controlling voltage $E_g$ may originate in any desired source and gain of the amplifier will be controlled by varying the resistance of $R_2$ accordingly through the light from $L_1$ falling on the resistance, the light emanation varying with the gain controlling voltage.

It has been found that the gain of the amplifier may be proportional to the gain controlling voltage within plus or minus one decibel over a 20 to 1 change in controlling voltage.

While a certain representative embodiment and details have been shown for the purpose of illustrating the invention, it will be apparent to those skilled in this art that various changes and modifications may be made therein without departing from the spirit or scope of the invention.

What is claimed is:

1. A direct current amplifier having a feedback circuit including a resistor having resistance varying inversely with its exposure to light, a soft gas filled two-element light source, means for shielding said resistance from other light sources, an independent gain controlling voltage source for controlling light emanation from said light source, positive and negative reference voltages applied to said light source to sustain operation of said source when said gain control voltage is below the firing voltage thereof, diode means for preventing current flow from said positive reference voltage to said gain controlling voltage source, and manually adjustable resistor means in the feed back circuit for controlling the gain of the amplifier.

2. In combination, a direct current amplifier, an input voltage, a resistance connecting the input voltage to the amplifier, an output voltage terminal connected to the output of the amplifier, a gain control potentiometer having its resistance coil connecting the output voltage terminal to ground, a feed back resistor having its resistance decreasing with its exposure to light and connecting the arm of the gain control potentiometer to the input side of the amplifier, a soft gas filled two element light source for variably illuminating the feed back resistor, a negative reference voltage, a voltage drop potentiometer connected through its resistance coil to ground and connected by its arm to the negative side of the light source, a positive reference voltage, a resistance connecting the positive reference voltage to the positive side of the light source, an independent positive variable gain controlling voltage, a resistance connecting the gain controlling voltage to the positive side of the light source, and a diode interposed in the connection between the last named resistance and the positive side of the light source to allow current flow from the independent variable gain control voltage but preventing current flow thereto.

3. In combination, a direct current amplifier, an input voltage connecting to the amplifier, an output voltage terminal connected to the output of the amplifier, a gain control potentiometer having its resistance coil connecting the output voltage terminal to ground, a feed back resistor having its resistance decreasing with its exposure to light and connecting the arm of the gain control potentiometer to the input side of the amplifier, a soft gas filled two element light source for variably illuminating the feed back resistor, a negative reference voltage, a voltage drop potentiometer connected through its resistance coil to ground and connected by its arm to the negative side of the light source, a positive reference voltage connecting to the positive side of the light source, an independent positive variable gain controlling voltage connecting to the positive side of the light source, and a diode interposed between the independent gain control voltage and the positive side of the light source to allow current flow from the independent variable gain control voltage but preventing current flow thereto.

References Cited in the file of this patent

UNITED STATES PATENTS

| | | |
|---|---|---|
| 1,843,288 | Leonard | Feb. 2, 1932 |
| 2,208,617 | Wilson | July 23, 1940 |

(Other references on following page)

UNITED STATES PATENTS

| | | |
|---|---|---|
| 2,212,337 | Brewer | Aug. 20, 1940 |
| 2,231,527 | Chestnut | Feb. 11, 1941 |
| 2,283,241 | Van Cott | May 19, 1942 |
| 2,293,750 | Leibe | Aug. 25, 1942 |
| 2,343,207 | Schrader | Feb. 29, 1944 |
| 2,691,736 | Haynes | Oct. 12, 1954 |

| | | |
|---|---|---|
| 2,739,237 | Stone | Mar. 20, 1956 |
| 2,745,021 | Kurshan | May 8, 1956 |

FOREIGN PATENTS

| | | |
|---|---|---|
| 818,980 | France | June 28, 1937 |
| 611,390 | Great Britain | Oct. 28, 1948 |
| 1,058,559 | Germany | June 4, 1959 |